Patented Mar. 9, 1943

2,313,186

UNITED STATES PATENT OFFICE 2,313,186

PHONOGRAPH RECORD

David R. Wiggam, West Grove, Pa., assignor to Hercules Powder Company, Wilmington, Del., a corporation of Delaware No Drawing. Application July 15, 1939, Serial No. 284,702

7 Claims. (Cl. 106—37)

This invention relates to phonograph records and more particularly to phonograph records prepared from a composition which is tough and yet has good molding and sound reproducing qualities.

Phonograph records have for many years suffered from the defect of brittleness. This defect has been countenanced because the brittle resinous compositions heretofore used possessed the essential molding characteristics required in combination with fairly high recording fidelity and reasonably good resistance to warping. Good flow in molding and permanency of the impression are essential in phonograph records since a defect of the order of 0.0001 of an inch in the sound track is audible in playing the record.

Numerous tough plastic bases, for example nitrocellulose and cellulose acetate, have been proposed without making any considerable impression upon the art. These materials in hard compositions are not practicably molded since they flow poorly. If the temperature is raised to obtain better flow, decomposition is encountered. If sufficient softener is added to obtain the flow, the plastic is not hard enough to prevent warping, and sound fidelity is poor due to resiliency of the material of the sound track. The addition of sufficient filler to overcome these defects makes the plastics brittle.

It is an object of this invention to provide tough phonograph records having good wearing qualities and high permanent fidelity. It is a further object to provide records of a composition which is readily prepared, which has the good flow characteristics necessary to provide an accurate recording, and which has the necessary hardness, low degree of warping, and the playing qualities for permanent fidelity. Other objects will appear as this invention is described.

Now these objects are accomplished by utilizing for the molding of phonograph records a composition having as the essential plastic ingredient a combination of ethyl cellulose and substantially petroleum-hydrocarbon insoluble pine wood resin. To this combination may be added, and usually will be added, fillers and molding lubricants and, if desired, limited quantities of plasticizing agents may also be added.

The ethyl cellulose utilized in the records of this invention will be of the type soluble in the usual organic solvents. It will have an ethoxyl content from about 41 to about 51%, preferably an ethoxyl content in the range from about 44% to about 49%. The viscosity characteristics of the ethyl cellulose may vary widely, the higher viscosity material imparting a greater toughness to the compositions whereas a lower viscosity material imparts slightly better flow characteristics. In general, I have found satisfactory an ethyl cellulose which has a viscosity characteristic above about 2 seconds, preferably above about 20 seconds as measured by noting the time of fall of a $\frac{1}{8}$ inch steel ball through 10 inches of solution, in a 25 mm. diameter glass tube at 25° C., the solution consisting of 20% by weight of ethyl cellulose dissolved in a mixture consisting of 80% by weight of toluene, and 20% by weight of ethyl alcohol.

The material which is characterized by the term "substantially petroleum-hydrocarbon insoluble pine wood resin," herein and in the appended claims, is the resinous material which may be prepared from pine wood, preferably from stump pine wood, in the following manner. The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the resin used in the present compositions. Extraction of this mixture with a petroleum hydrocarbon such as, for example, gasoline, dissolves and removes the rosin. After separation of the rosin, high in abietic acid, a resinous residue remains which is low in abietic acid. Alternatively, the initial coal tar hydrocarbon extract may be treated with furfural, and the two layers which form separated in which case the resinous residue is found dissolved in the furfural from which it may be obtained by evaporation of the furfural. This resinous residue, used in the composition of the present invention, is characterized by a dark red brown color, cherry red in solution, and by substantial insolubility in petroleum hydrocarbons, but it will vary somewhat in its specific characteristics such as acid number, melting point, exact petroleum ether solubility, and content of naphtha and toluol insoluble material, depending upon the details of the extraction processes utilized. This resin will meet or nearly meet the following specifications, namely, substantial insolubility in petroleum hydrocarbons, substantially complete solubility in alcohol, a methoxy content from about 3% to about 7.5% (usually from about 4% to about 6%) an acid number in the range from about 90 to about 110, and a drop melting point in the range from about 95° C. to about 125° C.

It may be desirable, although it is not essential, in the production of phonograph records in accordance with the present invention, to subject the substantially petroleum-hydrocarbon insoluble resin derived from pine wood to heat treatment prior to its use. By way of illustration, the resin may desirably be treated at a temperature from about 150° C. to about 325° C. for a period from about 10 minutes to about 2 hours, depending upon the temperature.

The ethyl cellulose and the hereinabove mentioned resin utilized in the phonograph records of this invention are proportioned in such a manner as to obtain a composition which is tough and hard and at the same time has the exacting molding characteristics required. With each 10 parts of ethyl cellulose there may be used a quantity of substantially petroleum-hydrocarbon insoluble pine wood resin in the range from about 3 parts to about 10 parts by weight. Preferably for each 10 parts of ethyl cellulose about 5 to about 6 parts of the resin are utilized.

The compositions utilized for the records of this invention will preferably contain a filler although this is not absolutely essential. For example, fillers such as china clay, other fine smooth clays, finely ground slate, barytes or precipitated barium sulfate, kieselguhr, silica powder, carbon black, whiting, titanium dioxide, zinc oxide, etc. may be incorporated. Coloring agents may be added although usually carbon black suffices. Cellulosic fillers such as cotton floc comminute, cotton linters, wood flour, etc. may be utilized if desired but the compositions utilized in the present invention are sufficiently tough so that now it is no longer necessary to use cellulosic fillers in the interests of improved toughness. Cellulosic fillers are preferably avoided as they are all more or less sensitive to moisture and thus tend to cause dimensional changes as atmospheric conditions change.

It is to be noted that the combinations of ethyl cellulose and the hereinbefore described resin are hard as well as tough and unlike other tough plastics proposed for records, they do not require large quantities of fillers. Heretofore a quantity of filler above 50%, often 60% to 80%, of the composition has been used. In the compositions utilized in the present invention, the filler content is preferably kept within the range from about 15% to about 25% of the composition, although the filler may comprise, for example, from about 0 to about 50% of the composition. However, it has been found that above about 30%, brittleness of the composition increases as additional filler is added.

Preferably the compositions utilized will also include a molding lubricant. Suitable molding lubricants are natural waxes such as montan wax, japan wax, carnauba wax, etc.; stearic acid, paraffin wax, butyl stearate; insoluble metallic soaps such as zinc stearate, magnesium stearate; mineral oil, etc. Molding lubricants improve the flow in molding; sharpen the fusion points of the composition; improve the smoothness of the molded surface; facilitate mold release; and also reduce wear and improve playing qualities by cutting down needle drag. The natural waxes are particularly useful, although like other lubricants, they should be free from grit and other solid impurities. The compositions of this invention are unusually compatible with waxy substances so that considerably more lubricant can be incorporated than in the compositions heretofore proposed without weakening the record. In general, the lubricant will comprise up to about 15% of the composition. Preferably natural waxes are used, for example montan wax, and preferably the quantity of lubricant will vary from about 3% to about 8% of the composition by weight.

Small portions of plasticizers compatible with the combination of ethyl cellulose and resin may be incorporated in the composition, for example, quantities up to about 10% of the composition. Higher quantities might be added but usually are avoided as they tend to cause excessive softening and warping. Where a plasticizer is used, a quantity in the range from about 2% to about 5% of the composition is preferable. Such small quantities do not cause undue softening and have the advantage of aiding in the preparation of a smooth, homogeneous plastic by acting as a blending agent for the components, and they further slightly aid the flow of the composition in molding. It is to be noted that the compositions utilized in the invention are distinguished from prior proposed compositions based on cellulose derivatives in that very small quantities or no plasticizer at all may be used. Suitable plasticizers for these compositions are, for example, dibutyl phthalate, diamyl phthalate, tricresyl phosphate, triphenyl phosphate, chlorinated naphthalene derivatives, chlorinated diphenyl derivatives, mineral oil, castor oil, etc.

The molding compositions used to prepare the records of this invention may be prepared by mixing the components together and colloiding the mass in a suitably heated Banbury mill. The mill is maintained at a temperature sufficiently high to colloid the mass efficiently and preferably is not allowed to rise appreciably high. For example, the mixing operation may be started with the mill at 200° F. and the temperature raised during about 10 minutes to about 270° F. If the mass has not colloided to a homogeneous plastic, the temperature may be lowered to 150–200° F. and again slowly raised. This may be repeated until a homogeneous colloid is obtained. When the mass has become homogeneously colloided, the warm composition is removed and formed into suitable blanks in the usual manner. Alternatively the composition may be colloided and sheeted on a two-roll mill at temperatures in general of the same order as those used in the Banbury mill.

The phonograph records may be molded in the usual manner by pressing suitably preheated blanks of the composition at a pressure, for example, from about 1,000 to about 3,000 pounds. The temperature of molding will be varied somewhat with the particular formulation utilized, a sufficiently high temperature for a good impression being used. The compositions utilized in this invention are of excellent stability at molding temperatures and require no stabilizers to prevent decomposition.

The record will usually consist entirely of a single composition. However, a core different from the surface may be used if desired. Such construction adds manufacturing complications and is unnecessary as the compositions utilized do not require special cores to provide tough records.

The following table gives examples of compositions suitable for utilization in preparing the records in accordance with this invention. All proportions given in the table and in the specification and claims are by weight:

Table

| | 1 | 2 | 3 | 4 | 5 | 6 | 7 | 8 |
|---|---|---|---|---|---|---|---|---|
| Ethyl cellulose | 45% | 48.5 | 45 | 42.9 | 43.5 | 56.3 | 48.7 | 46.1 |
| Substantially petroleum-hydrocarbon insoluble pine wood resin | 25 | 27.5 | 25 | 23.8 | 24.0 | 31.2 | 27.0 | 25.6 |
| Montan wax | 7.5 | 8 | 7.5 | 7.15 | 7.3 | 9.4 | | 7.7 |
| Dibutyl phthalate | 2.5 | | 2.5 | 7.15 | 2.4 | 3.1 | 2.7 | |
| Carbon black | 10 | 8 | 10 | 9.5 | 9.7 | 1.0 | 10.8 | 10.3 |
| Zinc oxide | 10 | 8 | 10 | 9.5 | 9.7 | | 10.8 | 10.3 |
| Paraffin base mineral oil | | | | | | 3.4 | | |

The ethyl cellulose utilized in Nos. 1 and 2, had a viscosity characteristic of 350 seconds in 12.45% solution (otherwise following the viscosity measurement hereinabove set forth) and a 47.8% ethoxyl content. For No. 3, ethyl cellulose of a viscosity of 6.8 seconds in the usual 20% solution and 48.2% ethoxyl was used while for Nos. 4–8 inclusive the viscosity was 68.7 seconds in 20% solution and the ethoxyl content 47.9%. The resin of Ex. 6 was of the hereinbefore mentioned heat-treated type. The small quantity of carbon black in Ex. 6 was added for coloring purposes only.

The records in accordance with this invention are tough, strong and resistant to warping. Because of these characteristics they may be made thinner than usual, and thus lighter in weight, thereby bringing about a saving in material and shipping costs. They wear well and are low in needle drag. These records are characterized by high fidelity of sound reproduction and they maintain this high fidelity in loud passages. Unexpectedly, the records in accordance with this invention were found to possess an extremely low background noise level, due, it is thought, to the combination of hardness with smooth homogeneity in the composition utilized and also to the low filler content of the compositions.

It will be apparent from the above description that in preparing the records according to this invention, the use of volatile solvents has been entirely avoided. This is possible because of the nature of the constituents. By avoiding volatile solvents the preparation is made safer as fire hazards are avoided. The complete avoidance of volatile solvents also reduces warpings since there is now no residual solvent in the composition.

The compositions utilized in the records of this invention may be reused if desired. Flashings, scrap, unsalable records, etc. may be reworked, if desired, thereby avoiding loss of material. Conveniently scrap is added to a new batch during the colloiding operation.

It will be understood that the details and examples hereinbefore set forth are illustrative only, and that the invention as broadly described and claimed is in no way limited thereby.

What I claim and desired to protect by Letters Patent is:

1. A phonograph record having a reproducing surface consisting of a molded composition comprising a tough, smooth, homogeneous plastic mixture of 10 parts of ethyl cellulose and from about 3 parts to about 10 parts of substantially petroleum-hydrocarbon insoluble pine wood resin as essential constituents.

2. A phonograph record having a reproducing surface consisting of a molded composition comprising a tough, smooth, homogeneous plastic mixture of 10 parts of ethyl cellulose and from about 3 parts to about 10 parts of substantially petroleum-hydrocarbon insoluble pine wood resin as essential constituents and a filler.

3. A phonograph record having a reproducing surface consisting of a molded composition comprising a tough, smooth, homogeneous plastic mixture of 10 parts of ethyl cellulose and from about 3 parts to about 10 parts of substantially petroleum-hydrocarbon insoluble pine wood resin as essential constituents and a filler, the filler consisting of less than 50% of the entire composition.

4. A phonograph record having a reproducing surface consisting of a molded composition comprising a tough, smooth, homogeneous plastic mixture of 10 parts of ethyl cellulose and from about 3 parts to about 10 parts of substantially petroleum-hydrocarbon insoluble pine wood resin as essential constituents and a molding lubricant.

5. A phonograph record having a reproducing surface consisting of a molded composition comprising a tough, smooth, homogeneous plastic mixture of 10 parts of ethyl cellulose and from about 3 parts to about 10 parts of substantially petroleum-hydrocarbon insoluble pine wood resin as essential constituents and a plasticizer compatible with the said ingredients.

6. A phonograph record having a reproducing surface consisting of a molded composition comprising a tough, smooth, homogeneous plastic mixture of 10 parts of ethyl cellulose and from about 3 parts to about 10 parts of substantially petroleum-hydrocarbon insoluble pine wood resin as essential constituents, a plasticizer compatible with the said ingredients and a molding lubricant.

7. A phonograph record having a reproducing surface consisting of a molded composition comprising a tough, smooth, homogeneous plastic mixture of 10 parts of ethyl cellulose and from about 3 parts to about 10 parts of substantially petroleum-hydrocarbon insoluble pine wood resin as essential constituents, a plasticizer compatible with the said ingredients and montan wax.

DAVID R. WIGGAM.